US011241660B2

(12) United States Patent
Wang et al.

(10) Patent No.: US 11,241,660 B2

(45) Date of Patent: Feb. 8, 2022

(54) PREPARATION OF HAND-CARRY GRAVITY-DRIVEN WATER FILTER WITH HIGH THROUGHPUT AND WATER DISINFECTION PERFORMANCE

(71) Applicant: THE UNIVERSITY OF HONG KONG, Hong Kong (CN)

(72) Inventors: Jianqiang Wang, Hong Kong (CN); Xiaonan Shi, Hong Kong (CN); Zhe Yang, Hong Kong (CN); Chuyang Tang, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 314 days.

(21) Appl. No.: 16/323,022

(22) PCT Filed: Aug. 8, 2016

(86) PCT No.: PCT/CN2016/093965

§ 371 (c)(1),
(2) Date: Feb. 4, 2019

(87) PCT Pub. No.: WO2018/027479

PCT Pub. Date: Feb. 15, 2018

(65) Prior Publication Data

US 2019/0168172 A1 Jun. 6, 2019

(51) Int. Cl.

*B01D 71/42* (2006.01)
*B01D 63/08* (2006.01)
*B01D 69/02* (2006.01)
*B01D 69/10* (2006.01)

(Continued)

(52) U.S. Cl.

CPC ......... *B01D 69/125* (2013.01); *B01D 63/081* (2013.01); *B01D 67/0004* (2013.01);

(Continued)

(58) Field of Classification Search

CPC .......... B01D 2239/025; B01D 2323/39; B01D 71/56; B01D 2325/48; B01D 69/10;

(Continued)

(56) References Cited

U.S. PATENT DOCUMENTS 4,812,238 A * 3/1989 Cadotte .............. B01D 67/0093 210/500.3
8,210,360 B2 7/2012 Routkevitch et al.

(Continued)

FOREIGN PATENT DOCUMENTS

CN 101947415 A 1/2011
CN 104226126 A 12/2014

(Continued)

OTHER PUBLICATIONS

International Search Report and Written Opinion dated Apr. 28, 2017 in International Application No. PCT/CN2016/093965.

*Primary Examiner* — Ana M Fortuna

(74) *Attorney, Agent, or Firm* — Saliwanchik, Lloyd & Eisenschenk

(57) ABSTRACT

A hand-carry gravity-driven water filter with high throughput and water disinfection performance is formed. Membranes used for this water filter can be fabricated using electrospun method and non-solvent induced phase inversion method. A novel composite membrane structure (interwoven composite structure) was designed for further enhances water permeability and mechanical strength. The composite membrane can be composed of nanofibers with different diameter from the same polymer or different polymers. Membrane porosity and surface pore size can be controlled. Silver nanoparticles can be in-situ loaded on the surface of the membranes. The developed filter is effective for removal of a wide range of contaminants (e.g., pathogens, suspended solids and heavy metals). The purification (Continued)

process can be carried out under the drive of gravity (with an option for mechanically-enhanced filtration) without electricity.

16 Claims, 6 Drawing Sheets

(51) Int. Cl.
*C02F 1/44* (2006.01)
*C02F 1/50* (2006.01)
*B01D 69/12* (2006.01)
*B01D 67/00* (2006.01)
*B01D 69/14* (2006.01)

(52) U.S. Cl.
CPC ..... *B01D 67/0006* (2013.01); *B01D 67/0016* (2013.01); *B01D 67/0079* (2013.01); *B01D 67/0088* (2013.01); *B01D 69/02* (2013.01); *B01D 69/10* (2013.01); *B01D 69/12* (2013.01); *B01D 69/141* (2013.01); *B01D 71/42* (2013.01); *C02F 1/44* (2013.01); *C02F 1/50* (2013.01); *B01D 2313/243* (2013.01); *B01D 2323/39* (2013.01); *B01D 2323/40* (2013.01); *B01D 2323/48* (2013.01); *B01D 2325/02* (2013.01); *B01D 2325/04* (2013.01); *B01D 2325/48* (2013.01); *C02F 2303/04* (2013.01)

(58) Field of Classification Search
CPC ............ B01D 2239/1233; B01D 69/12; D01D 5/0038; D04H 1/728
See application file for complete search history.

(56) References Cited

U.S. PATENT DOCUMENTS

2002/0175449 A1* 11/2002 Chu ....................... D04H 1/728 264/465
2010/0051538 A1* 3/2010 Freeman ................ B01D 71/60 210/500.33
2010/0107578 A1* 5/2010 Behrendt ............... D04H 1/728 55/385.2
2010/0215939 A1* 8/2010 Westbroek ........... D01D 5/0061 428/292.1
2012/0137885 A1* 6/2012 Dullaert ............... D01D 5/0038 96/12
2012/0241371 A1* 9/2012 Revanur ................ B82Y 40/00 210/488
2012/0318731 A1* 12/2012 Elbahri ..................... D01F 6/36 210/500.25
2013/0048579 A1 2/2013 Haslam et al.
2013/0256230 A1* 10/2013 Dullaert .................... D01F 6/60 210/650
2013/0334130 A1* 12/2013 Ganguli ................. B01D 65/08 210/500.29
2016/0303498 A1* 10/2016 Doucoure .......... B01D 39/2017
2019/0193033 A1* 6/2019 Sahadevan ............. B01D 71/56

FOREIGN PATENT DOCUMENTS

CN 104906963 A 9/2015
WO WO-2008142023 A2 * 11/2008 ............... B32B 5/26

* cited by examiner

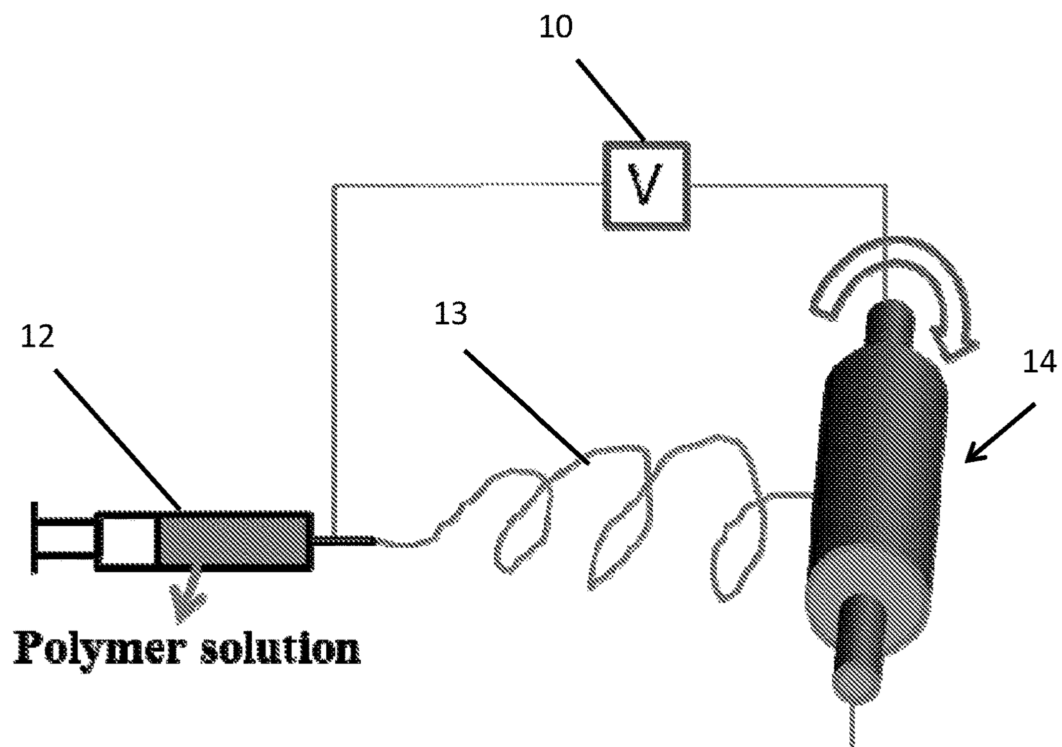
Fig. 1
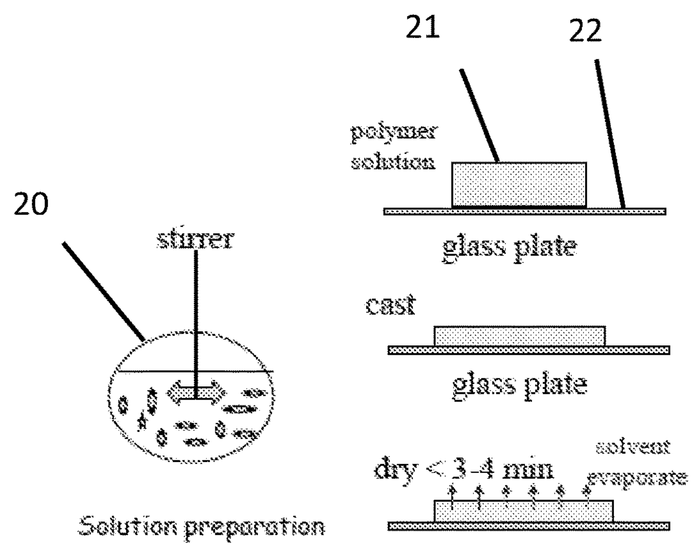
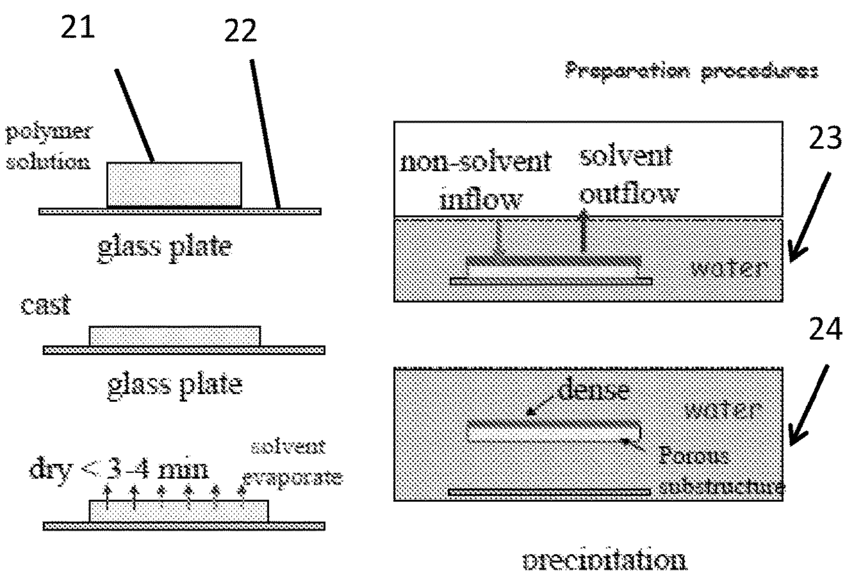
Fig. 2a Fig. 2b Fig. 2c

Symmetric structure

Asymmetric structure

Simple structure

Composite structure

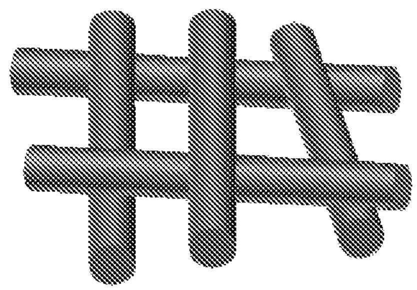
Simple structure
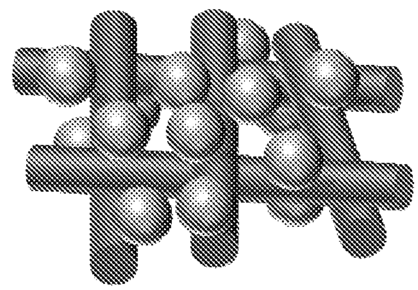
Composite structure with nanobeads or microspheres
Fig. 5a
Fig. 5b

PREPARATION OF HAND-CARRY GRAVITY-DRIVEN WATER FILTER WITH HIGH THROUGHPUT AND WATER DISINFECTION PERFORMANCE

CROSS-REFERENCE TO RELATED APPLICATION

This application is the U.S. national stage application of International Patent Application No. PCT/CN2016/093965, filed Aug. 8, 2016, the disclosure of which is incorporated herein by reference in its entirety.

FIELD OF THE INVENTION

The present invention relates a novel hand-carry gravity-driven (or mechanically-enhanced) water filter with high throughput and water disinfection capabilities. The present water filter can supply safe drinkable water by simple purification of various contaminated waters, such as river water, rain water, emergency water in disaster areas, etc.

BACKGROUND OF THE INVENTION

Timely supply of safe water at outdoor or emergency situation is critical for human health. Water filters in current use for these applications are mostly composed of membranes prepared by the phase inversion method. However, due to the low porosity and high mass transfer resistance of these membranes, the throughput of the filters is limited.

Although the existing methods are effective for water treatment, they are limited when used as portable water filtration devices. In particular, the methods of coagulation, flocculation and sedimentation for cleaning water, and chlorine, ozone or ultraviolet radiation for disinfecting water are practical and suitable for centralized water treatment facilities. However, distillation and electrodialysis processes are not suitable for portable outdoor water purification technology due to their high energy consumption. Granular media filtration and adsorption methods suffer from low efficiency, which makes it difficult to use them for outdoor water purification.

Membrane technologies have recently come into use for water purification. Reverse osmosis (RO) and nanofiltration (NF) membranes are being used for water treatment. However, high pressure is needed in these two processes, which means high energy consumption. Low external pressure is needed in ultrafiltration (UF) and microfiltration (MF) processes. However, the low rejection performances of the existing UF and MF membranes limit their uses in outdoor applications. More recently, forward osmosis processes have attracted more attention for outdoor water purification. However the draw solution used in this process limits its application.

Nanofiber-based membranes have high porosity and controllable pore size, which can significantly improve the efficiency of a water filter. However, there is little evidence of the use of nanofiber membrane-based water filters with designed structure and surface chemical properties in products or potential products that provide such gravity-driven outdoor water treatments.

SUMMARY OF THE INVENTION

The present invention relates to a water filter formed for effective removal of a wide range of contaminants (e.g., pathogens, suspended solids and heavy metals) as part of a purification process. The purification process can be carried out under the force of gravity (with an option for mechanically-enhanced filtration) without electricity.

In one exemplary embodiment of the invention, the water filter is small enough to be hand carried. Also, because of the membrane used, the filter has a high throughput and can be developed for outdoor applications. In particular, the membrane has a novel composite structure (i.e., an interwoven composite structure).

The water filter of the present invention can supply safe drinkable water by simple purification of various contaminated waters, such as river water, rain water and emergency water in a disaster area etc. Because the purification process can be carried out under the force of gravity (with an option for mechanically-enhanced filtration) without electricity, it is particularly useful for outdoor application where an energy source is not available. The invention may also find applications for wastewater treatment, wastewater reclamation, and desalination (e.g., membrane modules used in membrane bioreactors, as a pretreatment step and polishing step for reverse osmosis).

Silver nanoparticles may be loaded in-situ on the surface of the membrane to provide for water disinfection. The filter is effective for removal of a wide range of contaminants (e.g., pathogens, suspended solids and heavy metals). The water filter has excellent antifouling properties as well as the anti-microbial properties, and can be easily regenerated by water flushing or physical cleaning. Further, the membranes may be mounted in a folded configuration to increase the effective membrane surface area.

Thus, particles (e.g., suspended inorganic particles and organic particles), biological entities (e.g., pathogen and bacteria), and heavy metal ions (e.g., $Pb^{2+}$, $Cd^{2+}$, $Ni^{2+}$ and $Cr^{6+}$) can be removed after purification by this water filter.

In one embodiment, the present invention relates to a composite membrane comprising polymeric nanofibers, the composite membrane having a composite structure of large diameter nanofibers and small diameter nanofibers having a number average diameter in the range of 100-1000 nm, the polymeric nanofiber membrane has a porosity in the range of 75-95% and a mean pore size in the range of 10-1000 nm.

In a further embodiment, the composite membrane has a thickness of 50-500 μm.

In still a further embodiment, the large diameter nanofibers have diameters in the range of 200-1000 nm and the small diameter nanofibers have diameters in the range of 100-500 nm.

In still a further embodiment, the polymeric nanofibers comprising different polymeric nanofibers (hydrophobic or hydrophilic).

In still a further embodiment, the polymers forming the polymeric nanofibers are selected from a group consisting of poly(acrylonitrile) (PAN), poly(vinyl alcohol) (PVA), poly (vinyl fluoride) (PVDF), chitosan, polysulfone (PSf), polyethersulfone (PES), poly(methyl methacrylate) (PMMA) and poly(vinyl butyral) (PVB).

In still a further embodiment, the composite membrane further comprising nano-beads or microspheres.

In still a further embodiment, the nano-beads or microspheres have an average diameter of 20-2000 nm.

In still a further embodiment, the composite membrane further comprising a surface coating of polydopamine compounds.

In still a further embodiment, the composite membrane further comprising in-situ surface loaded silver nanoparticles.

In still a further embodiment, the in-situ surface loaded silver nanoparticles are reduced by the pre-coated polydopamine layer.

In still a further embodiment, the in-situ surface loaded silver nanoparticles have a loading amount of 0 wt. %-5.0 wt. %.

In still a further embodiment, the in-situ surface loaded silver nanoparticles have an average diameter of 0-100 nm.

In one embodiment, the present invention relates to a gravity-driven nano-fibrous membrane filter comprising: a support structure forming an open top volume; and a composite membrane according to the preceding embodiments on at least a bottom of the support structure, said composite membrane having a folded configuration, said filter accepting feed water at the open top and allowing cleaned water to exit below the membrane at the bottom.

In a further embodiment, the filter further comprising a mechanically assisted vacuum system for drawing feed water entered at the top of the filter through the membrane.

In still a further embodiment, the mechanically assisted vacuum system comprises a piston located below the filter and a handle connected to the piston that allows the piston to be pulled down creating a vacuum on the opposite side of the membrane from the feed water.

In still a further embodiment, silver is loaded onto the composite membrane to provide water purification.

In one embodiment, the present invention relates to a process for fabricating a nanofibrous membrane comprising the steps of: preparing a solution by mixing and annealing in a sealed container a polymer mixture consisting of a certain amount of polymer and additives in an organic solvent at 50~90° C. until homogenous, cooling the polymer mixture to room temperature; applying voltage in the range of 10-30 kV (preferably 15-25 kV) to the solution at room temperature as it is ejected in a stream from a syringe toward a rotating metal drum; feeding the solution from the syringe at the rate 0.5-2.0 mL/h (preferably 1.0-1.5 mL/h); and collecting the stream as nanofibers on the rotating metal drum at a distance of 5.0-20.0 cm (preferably 10-15 cm) from the exit of the syringe.

In one embodiment, the present invention relates to a non-solvent induced phase separation (NIPS) process for fabricating a nanofibrous membrane comprising the steps of: preparing a solution by mixing and annealing in a sealed container a polymer mixture consisting of a certain amount of polymer and additives in an organic solvent at 50~90° C. until homogenous, cooling the polymer mixture to room temperature; casting with a thickness the solution at room temperature onto a clean and smooth glass plate; quickly and smoothly immersing the glass plate into a coagulation water bath; and after the substrate is formed by phase inversion, removing the excess solvent and additives by soaking in DI water.

In one embodiment, the present invention relates to a process for fabricating a composite membrane nanofiber structure, comprising the steps of: preparing a compound by mixing and annealing in a sealed container a polymer mixture consisting of a certain amount of polymer and additives in an organic solvent at 50~90° C. until homogenous, cooling the polymer mixture to room temperature; fabricating a membrane substrate from the room temperature polymer mixture; and subjecting the membrane substrate to interfacial polymerization by bringing it into contact with a polyamine aqueous solution for 1-1200 seconds (preferably 30-600 s), removing the excess polymer solution from the surface of the substrate, immediately bringing the substrate into a TMC n-hexane solution for 1-600 s (preferably 10-300 s), and after the desired active layers have been formed, rinsing the membrane thoroughly with hexane and storing it in DI water at 15-25° C. (preferably 20° C.) before characterization.

In a further embodiment, the step of bringing the membrane substrate into contact with the polyamine aqueous solution is performed by pouring it into the polyamine aqueous solution.

In still a further embodiment, the step of bringing the substrate into the TMC n-hexane solution is performed by pouring it into the TMC n-hexane solution.

In still a further embodiment, the process further including a step of loading silver nanoparticles in-situ on the surface of the membrane to provide for water disinfection.

In still a further embodiment, the step of silver loading the membrane comprises the steps of coating DOPA or L-DOPA on the surface of the membranes by simple immersion in a Tris buffer solution; and immersing the membranes into a silver nitrate aqueous solution.

In still a further embodiment, the step of coating the membranes is carried out with a 0.5-5.0 g/L solution bath of DOPA or L-DOPA for 0.5 hours to 24 hours with a pH of 7.0 to 9.0 for the Tris buffer solution.

In still a further embodiment, the step of immersing the membranes in the silver nitrate aqueous solution is carried out with a 0.5-10.0 g/L (preferably 1.0-5.0 g/L) silver nitrate aqueous solution for 0.5 hours to 10 hours.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1 is a schematic diagram of apparatus used in an electrospun process as used in the present invention;

FIGS. 2*a-c* are schematic diagrams of a NIPS flat membrane fabrication process as used in the present invention, wherein FIG. 2*a* shows mixing of the polymer solution, FIG. 2*b* shows casting and drying the solution on a glass plate and FIG. 2*c* shows dipping the glass plate into water to precipitate the membrane;

FIGS. 5*a-b* are diagrams showing a simple structure (FIG. 5*a*) and a composite structure (FIG. 5*b*) with nanobeads or microspheres;

FIGS. 6*a-b* show schematic diagrams of the process for surface coating and silver loading according to an embodiment of the present invention, wherein FIG. 6*a* is a schematic diagram of the nanofibrous membrane at stages of the fabrication process and FIG. 6*b* is a schematic illustration of the steps of the fabrication process of the thin film nanocomposite (TFN) membrane;

FIGS. 7*a-c* are diagrams showing different water filter structures according to the present invention, wherein FIG. 7*a* shows the membrane at the base of the water feed with and without mechanical enhancement, FIG. 7*b* shows the membrane at the base and sides of the water feed with and without mechanical enhancement and FIG. 7*c* shows the membrane folded and located at the base and sides of the water feed with and without mechanical enhancement; and FIGS. 8*a-e* show SEM images of a nanofibrous membrane, an ultrafiltration (UF) and a nanofiltration membrane (NF), wherein FIG. 8*a* shows a homogenous structure, FIG. 8*b* shows a composite structure composed of nanofibers with different diameters, FIG. 8*c* shows a composite structure composed of nanofibers and nanobeads or microspheres, FIG. 8*d* shows the surface of an ultrafiltration membrane and FIG. 8*e* shows the surface of a nanofiltration membrane.

DETAILED DESCRIPTION OF EXEMPLARY EMBODIMENTS OF THE INVENTION

A hand-carry gravity-driven (or mechanically assisted) water filter with high throughput and water disinfection performance according to the present invention is fabricated in three steps: (1) membrane preparation; (2) membrane surface modification and (3) assembly.

Membranes used in the water filter are prepared by an electrospun method or a non-solvent induced phase separation method (NIPS). The electrospun technology is used for the fabrication of nanofibrous membranes (a schematic diagram of the electrospun process is shown in FIG. 1). Specifically, a high voltage from a power source 10 is applied to a polymer/solvent solution in a syringe 12. Therefore, the polymer solution becomes charged. When the electrostatic repulsion counteracts the surface tension of the polymer solution, the solution is stretched and can be ejected as a stream 13 from the syringe. If the molecular cohesion of the liquid is sufficiently high, the stream does not breakup and a charged liquid jet is formed. As the solvent in the jet evaporates in flight, a fiber is formed that is elongated by a whipping process caused by electrostatic repulsion initiated at small bends in the fiber. The fiber is finally deposited on a grounded collector, e.g., roller 14, which is turning as indicated by the arrow in FIG. 1. The elongation and thinning of the fiber resulting from this bending instability leads to the formation of uniform fibers with nanometer scale diameters.

A non-solvent induced phase separation (NIPS) process is commonly used for the preparation of separation membranes. The NIPS method helps fabrication of UF membranes. A schematic diagram of this process is shown in FIGS. 2*a* to 2*c*. Typically, a homogeneous polymer/solvent solution is first prepared with the aid of a stirrer. Then the polymer solution is cast on a clean and smooth glass plate. After a certain period of evaporation in air, e.g., 3 to 4 minutes, the newly cast liquid polymer membrane is put into a non-solvent bath, e.g., water, for the coagulation of the polymer. One piece of ultrafiltration (UF) polymer membrane is obtained when the coagulation is completed.

Figure 3A:
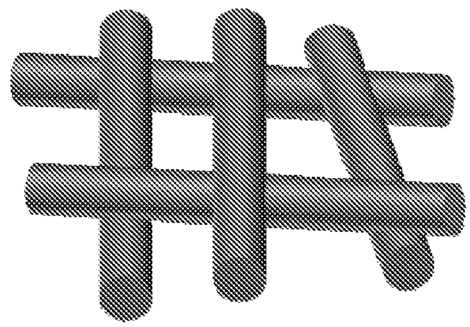
FIGS. 3*a-b* are diagrams showing symmetric (FIG. 3*a*) and asymmetric (FIG. 3*b*) membrane structures.
Figure 3B:
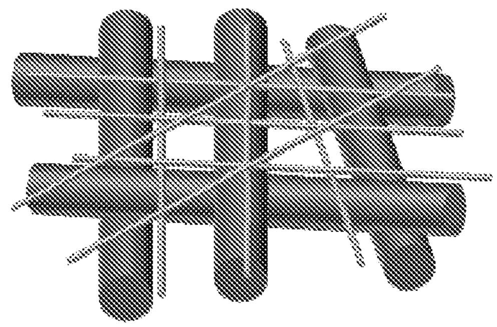
Figure 4A:
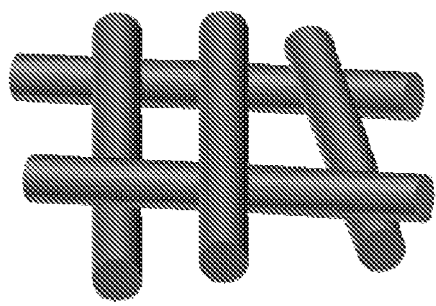
FIGS. 4*a-b* are diagrams showing simple (FIG. 4*a*) and composite (FIG. 4*b*) membrane structures.
Figure 4B:
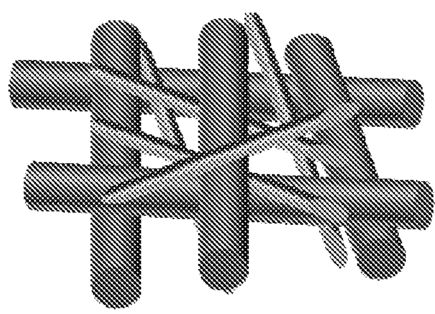

The present invention proposes a composite membrane nanofiber structures. In particular nanofibers with large-diameters of 200-1000 nm are used to provide a skeleton of the filter (to provide the required mechanical strength and permeability). FIGS. 3*a* and 4*a*. The space between the large-diameter fibers is filled with fibers with small-diameter of 100-500 nm in order to achieve high rejection of micro-organisms and particles. The average diameter of the nanofibers with large diameters and the nanofibers with small diameters together is between 100-1000 nm. FIGS. 3*b* and 4*b*. While FIGS. 5*a* and 5*b* show a simple nanofiber structure and a composite structure that also includes nano-beads or microspheres. In such a case the nano-beads or microspheres would have an average diameter of 20-2000 nm.

The polymer used for the preparation of base nanofibrous membranes and UF membranes is selected from various polymeric materials, such as polyacrylonitrile (PAN), poly (vinyl alcohol) (PVA), poly (vinyl fluoride) (PVDF), chitosan, polysulfone (PSf), polyethersulfone (PES), poly (methyl methacrylate) (PMMA) and poly (vinyl butyral) (PVB), etc. The concentration of the polymer in the solution is from 1.0 to 30.0 wt. % (preferably 4.0 to 20.0 wt. %). Appropriate solvents include deionized water, 1-methyl-2-pyrrolidinone (NMP), dimethyl formamide (DMF), dimethyl-acetamide (DMAc), acetic acid (AA) and combination thereof. Macromolecule organics, small molecule organic and inorganic salts, such as polyvinyl pyrrolidone (PVP), polyethylene glycol (PEG), acetone, isopropanol, ethanol, lithium chloride (LiCl), etc. act as additives to adjust electrospun properties, membrane porosity and/or hydrophobicity-hydrophilicity, of which concentration in polymer solution was from 0.1 to 5.0 wt. % (preferably 0.2~3.0 wt. %).

The polymeric materials can be summarized in the following chart.

| Polymeric materials | Solvent | Additives |
|---|---|---|
| Polyarcylonitrile (PAN) | Deionized water (DI water) | Polyvinyl pyroolidone (PVP) |
| Poly(vinyl alcohol) (PVA) | 1-methyl-2-pyrrolidinone (NMP) | Polyethylene glycol (PEG) |
| Poly(vinyl fluorid) (PVDF) | Dimethyl formamide (DMF) | Acetone |
| Chitosan | Dimethyl-acetamide (DMAc) | Isopropanol |
| Polysulfone (PSf) | Acetic acid (AA) | Ethanol |
| Polyethersulfone (PES) | Combination of above | Lithium Chloride (LiCl) |
| Poly(vinyl butyral) (PVB) | | |

In order to make a filter according to the present invention, the membrane surfaces are modified in order to get high rejection for heavy metal ions (e.g., $Pb^{2+}$, $Cd^{2+}$, $Ni^{2+}$ and $Cr^{6+}$) and high water disinfection (pathogen removal and inactivation) power. The materials used for the modification of membranes include: dopamine hydrochloride (DOPA), 3-(3.4-dihydroxyphenyl)-L-alanine (L-DOPA) silver nitrate, tris (hydroxymethyl) aminomethane (Tris) buffer, polyamine (e.g., o-phenylenediamine (OPD), m-phenylenediamine (MPD), bisphenol A (BPA), trihydroxypropane and molecules with polychloride and polysulfonylchloride such as trimesoyl chloride (TMC) and 1, 5-naphthalene-bisulfonyl chloride, etc). Deionized (DI) water is used as a water phase solvent for dissolving polymers with polyamine, polyhydric alcohol and polyphenol groups. Hexane, cyclohexane, Isopar serials etc. and combinations thereof are used as oil solvents for dissolving polymers with polychlorde and polysulfonylchloride groups. They are hexane, cyclohexane, Isopar seials etc and combination thereof. Macromolecule organics, small molecule organics and surfactants, such as dimethyl sulfoxide (DMSO), ε-carprolactam (CL), triethylamine (TEA), camphorsulfonic acid (CSA), sodium dodecyl sulfate (SDS), and their combinations are used to increase the miscibility of two immiscible phases.

Materials for modification of membranes can be summarized in the following chart.

| Materials | Solvent | Additives |
|---|---|---|
| dopamine hydrochloride (DOPA) | Deionized water (DI water) | dimethyl sulfoxide (DMSO) |
| 3-(3.4-dihydroxyphenyl)-L-alanine (L-DOPA) | tris (hydroxymethyl) aminomethane (Tris) buffer | ε-carprolactam (CL) |

-continued

| Materials | Solvent | Additives |
|---|---|---|
| silver nitrate | Hexane,, | triethylamine (TEA) |
| o-phenylenediamine (OPD) | cyclohexane | camphorsulfonic acid (CSA) |
| m-phenylenediamine (MPD) | Isopar | sodium dodecyl sulfate (SDS) |
| bisphenol A (BPA) | Combination of above | Combination of above |
| trihydroxypropane | | |
| trimesoyl chloride (TMC) | | |
| 1,5-naphthalene-bisulfonyl chloride | | |

During the preparation of a polymer solution for membrane fabrication, certain amounts of polymer and additives are mixed in organic solvent in a sealed container 20 at a certain temperature (preferably 50~90° C.) until homogenous. See FIG. 2*a*. The dope solution is degassed statically in the same container after cooling down to room temperature. The obtained polymer solution is used for the electrospun and NIPS processes. In the electrospun process, the applied voltage is in the range of 10-30 kV (preferably 15-25 kV), the rate of feed solution is 0.5-2.0 mL/h (preferably 1.0-1.5 mL/h), and the collection distance for nanofibers is from 5.0-20.0 cm (preferably 10-15 cm). The formed polymer nanofibers are collected by a rotating metal drum 14 in FIG. 1.

In the NIPS process, the casting solution 21 is directly cast with certain thickness onto a clean and smooth glass plate 22. See FIGS. 2*a* to 2*c*. The glass plate is immersed into a coagulation water bath 23 quickly and smoothly. After the substrate is formed by phase inversion, excess solvent and additives are removed by soaking in DI water before interfacial polymerization 24.

Prior to the interfacial polymerization, a uniform nanoparticle layer is deposited on the surface of a UF membrane. During the interfacial polymerization, a preformed membrane substrate is first poured with or soaked into a polyamine aqueous solution for 1~1200 seconds (preferably 30~600 seconds). Following this the excess polymer solution is removed from the surface, and is then immediately poured with or soaked into an acyl chloride n-hexane solution for 1~600 seconds (preferably 10~300 seconds). After the desired active layers has been formed, the membrane is rinsed thoroughly with hexane, and stored in 15-25° C. (preferably 20° C.) DI water before characterization.

The prepared nanofibrous membrane is surface coated with branched polyethylenimine (PEI) by a simple filtration method. PEI is dissolved in water with a concentration of 0.1-5.0 wt. %, after that the coated membrane is cross-linked by glycerol diglycidyl ether or glutaraldehyde at a temperature of 40-60° C. The prepared nanofiber membrane coated by amine groups has a high rejection for heavy metal ions (shown in Table 3). In particular, Table 3 shows the results of the removal of heavy metal ions.

Figure 6A:
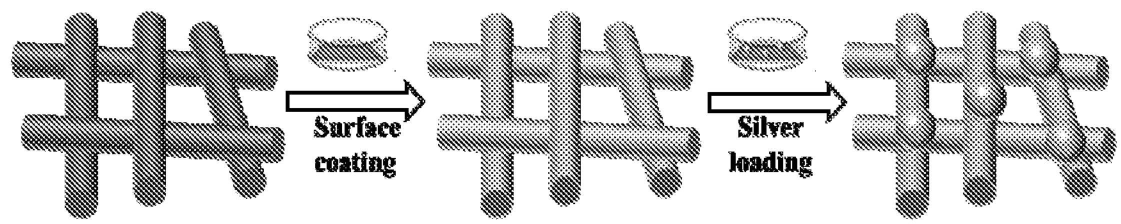
Figure 6B:
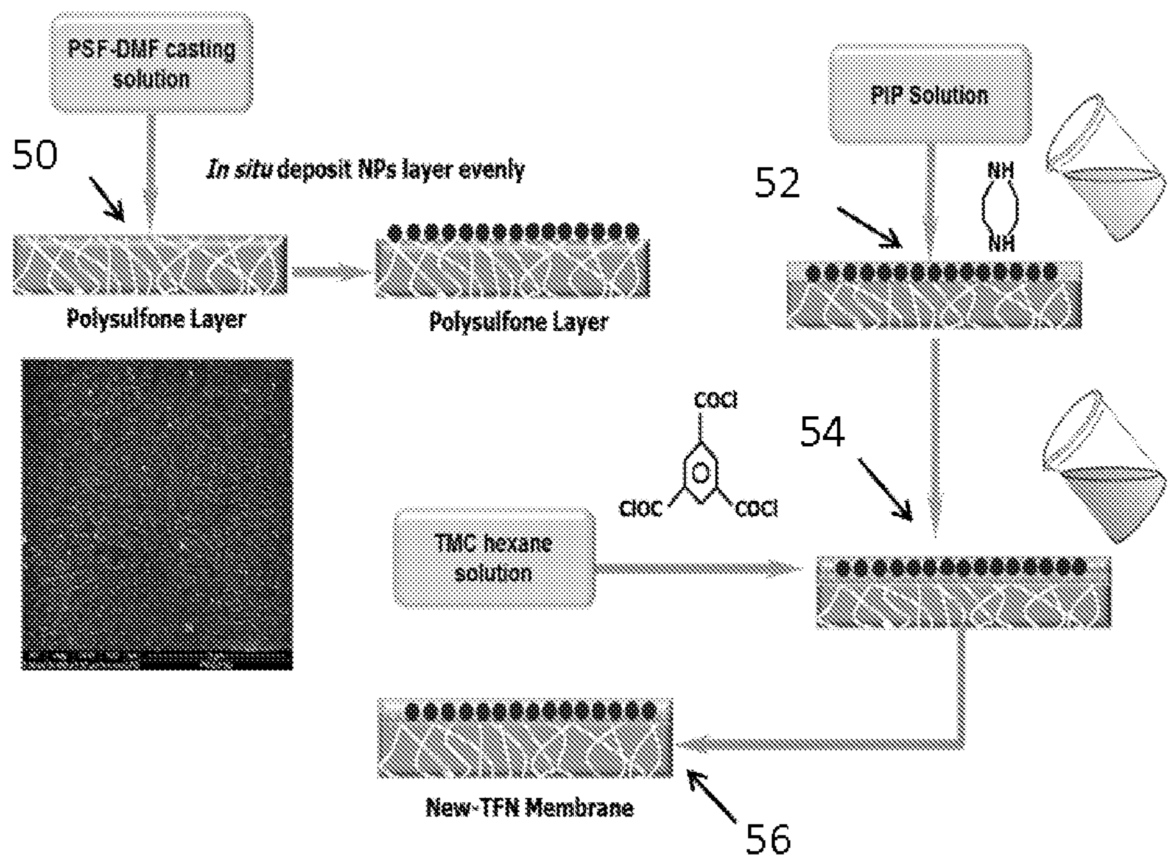

Silver nanoparticles having an average diameter of 0-100 nm may be loaded in-situ on the surface of the membrane to provide for water disinfection. The loading amount can be 0 wt. %-5.0 wt. %. FIGS. 6*a* and 6*b* illustrate schematic diagrams of the process for surface coating and silver loading. In FIG. 6*a* the schematic diagram shows the nanofibrous membrane at stages of the fabrication process and FIG. 6*b* is a schematic diagram of the steps of the fabrication process of TFN membranes. During the silver loading process, DOPA or L-DOPA is first coated on the surface of membranes by a simple immersion method. Typically, 0.5-5.0 g/L (preferably 1.0-3.0 g/L) of DOPA or L-DOPA in Tris buffer solution is used. The coating time is in the range of 0.5-24 hours. The pH value of the Tris buffer solution is in the range of 7.0-9.0 (preferably 8.0-8.5). After the pre-coating, the obtained membrane is immersed into a silver nitrate aqueous solution with a concentration of 0.5-10.0 g/L (preferably 1.0-5.0 g/L). The reaction period lasts from 0.5 to 10 hours.

FIG. 6*b* is a schematic diagram for the silver loading process. At step 50 in FIG. 6*b* a PSf-DMF casting solution is cast on a glass plate and a polysulfone layer is formed. Then an in-situ deposit nanoparticle layer is formed by taking advantage of the redox reaction between pre-coated polydopamine layer and silver nitrate. After that this polysulfone substrate is subjected to a PIP solution at step 52 in order to supply the aqueous phase for interfacial polymerization. At step 54 a TMC hexane solution is poured over the substrate to supply the oil phase for interfacial polymerization. At step 56 a new TFN membrane is formed.

The silver loaded nanofiber membrane has high water disinfection performance; the results are shown in Table 4. In particular, Table 4 shows the CFU data of nanofibrous membrane and NF membrane.

Figures 7A, 7B, 7C:
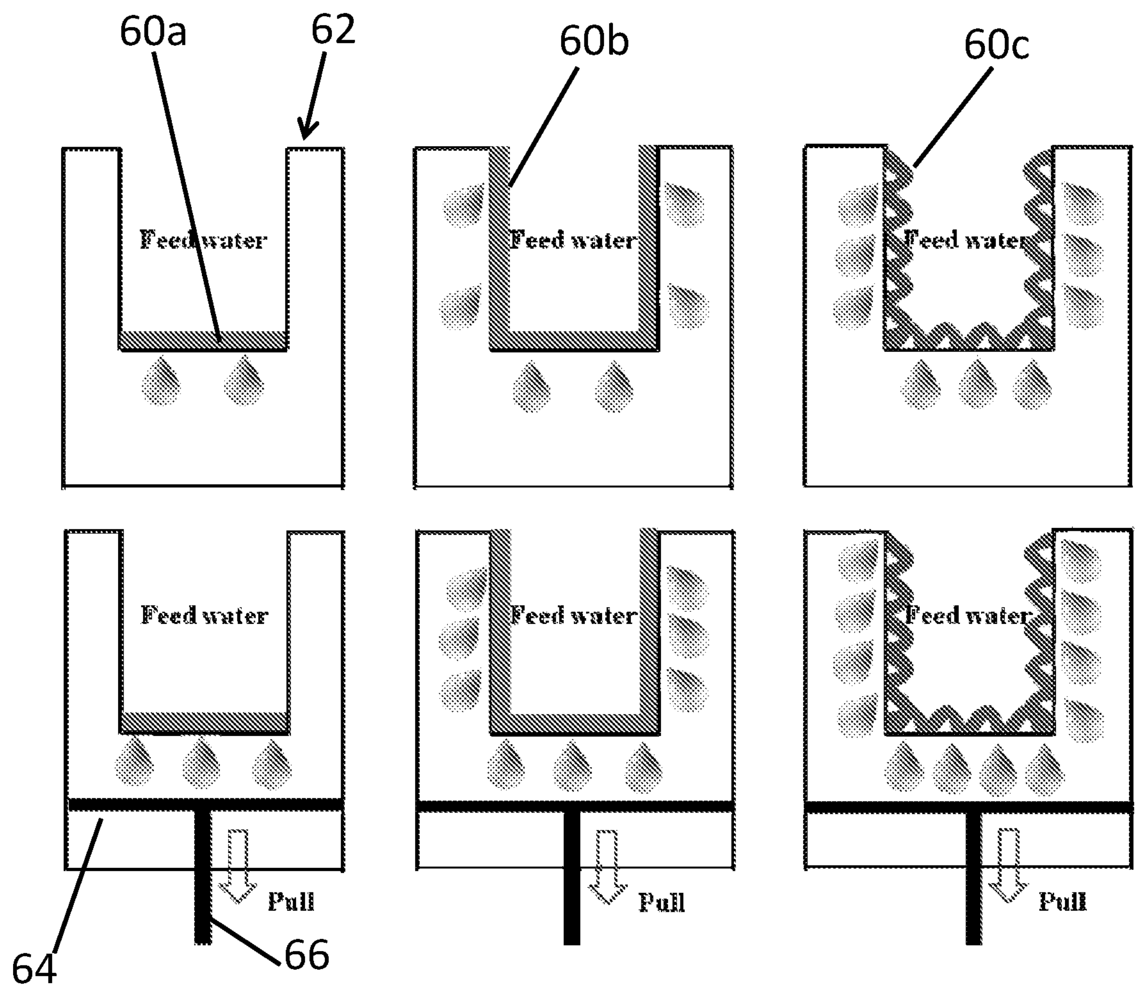

A prototype is fabricated by mounting the prepared membranes on different surfaces of the filter. To increase the water throughput of this filter, the membranes are provided with a folded configuration when mounted in a filter body. FIG. 7*c*. Meanwhile, a mechanically assisted water filter was also fabricated to further enhance the water throughput. The cross-sectional diagrams of the prototype are presented in FIGS. 7*a*-7*c*.

Example 1

PAN (1.0-15.0 wt. %, preferably 4.0-8.0 wt. %) was dissolved in DMF at 40-80° C. (preferably 60° C.) to prepare the homogeneous and transparent electrospun polymer solution. The dope solution was cooled down to room temperature and then degassed statically in the same container. Conditions for electrospun were listed as follows:

- rate of feed solution: 0.5-2.0 mL/h (preferably 1.0-1.5 mL/h)
- applied voltage: 5-30 kV (preferably 10-20 kV)
- air gap (collection distance): 5-20 cm (preferably 10-15 cm)
- drum rotating speed: 10-200 rpm (preferably 50-100 rpm)
- electrospun period: 1-30 h (preferably 5-20 h)

The polymer used can be polyacrylonitrile (PAN), poly (vinyl alcohol) (PVA), chitosan, polysulfone (PSf), polyethersulfone (PES), and poly(vinyl butyral) (PVB), etc. The solvent included deionized water, 1-methyl-2-pyrrolidinone (NMP), dimethyl formamide (DMF), dimethyl-acetamide (DMAc), acetic acid (AA) and a combination thereof.

The obtained electrospun membrane was hot pressed at 120-160° C. (preferably 140-150° C.) for 3 hours. Then the PAN nanofibrous membrane was immersed in dopamine Tris solution (0.5-5.0 g/L DOPA (preferably 1.0-3.0 g/L), 5-30 mM Tris-HCl (preferably 10-20 mM), pH 7.0-9.0 (preferably 7.5-8.5) under continuous shaking for 2-24 hours (preferably 10-20 h) at 25° C. The coated PAN membranes (cPAN) were rinsed using deionized water to remove the labile polydopamine (PDA) particles.

Silver nanoparticles were immobilized onto the cPAN membranes through a spontaneous reduction of silver ions in-situ by the reductive catechol groups contained in PDA. Typically, a cPAN coupon (diameter of 7.6 cm) was immersed into a 0.5-10.0 g/L (preferably 2-5 g/L) silver nitrate solution for 0.5-10 hours (preferably 2-5 h). During the entire process, the solution was covered by aluminum foil and was shaken continuously. The resulting silver-loaded membranes were thoroughly rinsed with deionized water.

The structure of the membranes could be a simple or symmetric structure as shown in FIG. 3*a*, FIG. 4*a* and FIG. 5*a*. Alternatively, it can be a composite structure which includes a combination of nanofiber with different diameters or nanobeads and microspheres as shown in FIG. 3*b*, FIG. 4*b* and FIG. 5*b*.

Three prototypes were fabricated with different membrane configurations 60*a*-60*c*. In the first one, the membrane 60*a* (effective area is about 15.2 $cm^2$) was mounted at the bottom of the filter support 62. FIG. 7*a*. In the first version feed water was poured into the support. However, in the second version mechanical enhancement was provided in the form of a piston 64 located below the membrane 60*a* which can be pulled downward by a handle 66 creating a vacuum that enhances the flow of water through the filter. In the second embodiment, the membrane 60*b* (effective area is about 84.2 $cm^2$) was wrapped on all the surfaces of the filter support. A first version relies on gravity feed and the second has the gravity feed enhanced with a piston below the filter membrane 60*b*. FIG. 7*b*. In the third version, a folded membrane 60*c* (effective area is about 168.4 $cm^2$) was mounted on all the surfaces of the filter support. Again one version was a gravity feed and the other used mechanical assistance. FIG. 7*c*.

Example 2

Prior to the electrospun of 1.0-4.0 wt. % PAN/DMF solution, an 8.0-15.0 wt. % PAN/DMF solution was first used for electrospun. Conditions for electrospun were listed as follows:

- rate of feed solution: 0.5-2.0 mL/h
- applied voltage: 5-30 kV
- air gap (collection distance): 5-20 cm (preferably 10-15 cm)
- drum rotating speed: 10-200 rpm (preferably 50-100 rpm)
- electrospun period: 1-30 h (preferably 5-20 h)

A polymer used can be polyacrylonitrile (PAN), poly (vinyl alcohol) (PVA), chitosan, polysulfone (PSf), polyethersulfone (PES), and poly(vinyl butyral) (PVB), etc. The solvent can include deionized water, 1-methyl-2-pyrrolidinone (NMP), dimethyl formamide (DMF), dimethylacetamide (DMAc), acetic acid (AA) and combination of thereof.

After that, the electrospun solution was changed to 1.0-4.0 wt. % PAN/DMF solution, and the electrospun process was continued for another 0-10 hours.

The modification processes for the asymmetric nanofibrous membrane were the same as Example 1. FIG. 6*a* Also, the prototype fabrication process was the same as in Example 1.

Example 3

1.0-4.0 wt. % and 8.0-12.0 wt. % PAN/DMF solutions were electrospun together. Conditions for the electrospun were as follows:

- rate of feed solution: 0.5-2.0 mL/h (preferably 1.0-1.5 mL/h)
- applied voltage: 5-30 kV (preferably 10-20 kV)
- air gap (collection distance): 5-20 cm (preferably 10-15 cm)
- drum rotating speed: 10-200 rpm (preferably 50-100 rpm)
- electrospun period: 1-30 h (preferably 5-20 h)

Three syringes with metal needles were used in the electrospun process. PAN/DMF solutions with higher concentration were filled in either two or one of the three syringes. The polymer used can be polyacrylonitrile (PAN), poly(vinyl alcohol) (PVA), chitosan, polysulfone (PSf), polyethersulfone (PES), and poly(vinyl butyral) (PVB), etc. The solvent can include deionized water, 1-methyl-2-pyrrolidinone (NMP), dimethyl formamide (DMF), dimethylacetamide (DMAc), acetic acid (AA) and combination of thereof.

The modification processes for the asymmetric nanofibrous membrane were the same as in Example 1. The prototype fabrication process was the same as Example 1.

Example 4

1.0-4.0 wt. % PAN/DMF solutions (to prepare nanofibers with small diameter) and 8.0-30.0 wt. % PVDF/DMF (to prepare nanofibers with large diameter) solutions were electrospun together. Conditions for the electrospun were listed as follows:

- rate of feed solution: 0.5-2.0 mL/h (preferably 1.0-1.5 mL/h)
- applied voltage: 5-30 kV (preferably 10-20 kV)
- air gap (collection distance): 5-20 cm (preferably 10-15 cm)
- drum rotating speed: 10-200 rpm (preferably 50-100 rpm)
- electrospun period: 1-30 h (preferably 5-20 h)

Three syringes with metal needle were used in the electrospun process. polymer/DMF solutions with higher concentration were filled in either two or one of the three syringes.

Polymers used for the preparation of nanofibers with small diameter can be polyacrylonitrile (PAN), poly(vinyl alcohol) (PVA), chitosan, polysulfone (PSf), polyethersulfone (PES), and poly(vinyl butyral) (PVB), etc. Polymers used for the preparation of nanofibers with large diameter can be poly(vinyl alcohol) (PVA), chitosan, polysulfone (PSf), polyethersulfone (PES), and poly(vinyl butyral) (PVB), etc. Solvents can include deionized water, 1-methyl-2-pyrrolidinone (NMP), dimethyl formamide (DMF), dimethyl-acetamide (DMAc), acetic acid (AA) and combination of thereof.

The modification processes for the asymmetric nanofibrous membrane structures (FIG. 3*b*) were the same as in Example 1. The prototype fabrication process was the same as Example 1.

Example 5

A polymer solution, which is made from PSf beads (15.0 wt. %) dissolved in DMF at 50° C. until homogeneous and transparent, was used as casting solution. The casting solution was cooled down to room temperature and then degassed statically in the same container. The casting solution was spread directly onto a smooth and clean glass plate. The glass plate with the whole composite was then immediately immersed in a coagulant bath containing room temperature tap water for at least 5 min to finish the phase inversion.

To fabricate nanofiltration membranes, Dopamine hydrochloride powder (0.4 g) was dissolved in 200 ml of a 10 mM Tris-HCl buffer solution with the pH adjusted to 8.5. The PDA coating solution was placed in a reservoir exposed to the active layer of the PSf membrane. Two electrical motordriven stirring paddles (See FIG. 2*a*) constantly mixed the PDA solution during the entire coating process. Under this condition, dopamine could be oxidized by oxygen and self-polymerize to PDA without severe aggregates. The PDA coating time to the PSf membrane was 0.5 hours. Next, the membrane was removed from the coating device and rinsed under running DI water for 30 min. Then, the membrane active layer was reacted with 200 ml $AgNO_3$ aqueous solution (4.0 g/L, pH unadjusted) in the same coating device for 5 hours under dark condition. Further, the membrane was soaked again in fresh DI water and rinsed for 30 min before testing. The stored PSf membrane was then immersed in a 0.1, 0.5, 1.0 and 2.0 wt. % PIP-water solution for 3 min. Extra solution on the surface was removed with a rubber roller. Then, the PSf support layer with PIP on the surface was placed in a 0.15 wt. % TMC-Hexane solution sealed in a lab bottle for 1 min, followed by the formation of a polyamide thin-film layer. Then, the nanofiltration membranes that were obtained were rinsed with pure hexane and post-treated in an oven at 80° C. for 5 min. Finally they were stored in DI water at 5° C.

Table 1 shows the properties of a PAN nanofibrous membrane and a PAN ultrafiltration membrane.

TABLE 1

Properties of a PAN nanofibrous membrane and a PAN ultrafiltration membrane.

| | Porosity (%) | BET surface area ($m^2/g$) | Mean pore size (nm) |
|---|---|---|---|
| PAN nanofibrous membrane | 89.6% | 24.5 | 190 |
| PAN ultrafiltration membrane | 76.7% | 19.3 | 15 |

In further embodiments, the porosity of the PAN nanofibrous or ultrafitration membrane can be 75%, 76%, 77%, 78%, 79%, 80%, 81%, 82%, 83%, 84%, 85%, 86%, 87%, 88%, 89%, 90%, 91%, 92%, 93%, 94% and 95%. In further embodiments, the mean pore size of the PAN nanofibrous or ultrafitration membrane can be 10 nm, 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm and 1000 nm.

Table 2 shows the water permeability properties of different membranes.

TABLE 2

Water permeability at different water head and different monomer concentration

| Membranes | Water permeability ($Lm^{-2}h^{-1}bar^{-1}$) |
|---|---|
| Nanofiber membranes | 15460 ± 44~71193 ± 2524 |
| Nanofiltration membrane PIP (0.5 wt. %) | 13.1 ± 0.3 |

TABLE 2-continued

Water permeability at different water head and different monomer concentration

| Membranes | Water permeability ($Lm^{-2}h^{-1}bar^{-1}$) |
|---|---|
| Nanofiltration membrane PIP (1.0 wt. %) | 10.2 ± 0.7 |
| Nanofiltration membrane PIP (2.0 wt. %) | 6.4 ± 0.6 |

Table 3 shows the results of heavy metal ion removal.

TABLE 3

Results of heavy metal ions removal.

| | $Pb^{2+}$ | $Cd^{2+}$ | $Ni^{2+}$ | $Cr^{6+}$ |
|---|---|---|---|---|
| Initial Concentration (μg/L) | 165 | 161 | 162 | 163 |
| Detection limit (μg/L) | 1.0 | 0.1 | 0.5 | 0.2 |
| Rejection * | 99.4% | 99.9% | 99.7% | 99.9% |

* Rejection results are calculated based on the detection limit, because no metal ions can be detected in permeates.

Table 4 shows the colony-forming unit (CFU) data of a nano-fibrous membrane and a nano-filtration (NF) membrane. A (CFU) is a unit used to estimate the number of viable bacteria or fungal cells in a sample. Table 4 particularly shows the effect of a silver loaded membrane.

TABLE 4

CFU data of nanofibrous membranes and nanofiltration membranes.

| | | | Control sample | Pristine membrane | Silver loaded membrane |
|---|---|---|---|---|---|
| Nano-fibrous membrane | CFU (cells/mL) | *E. coli* | $1.18 \times 10^8 \pm 2.36 \times 10^7$ | $1.00 \times 10^8 \pm 3.58 \times 10^7$ | 325 ± 263 |
| | | *B. subtilis* | $1.37 \times 10^7 \pm 2.52 \times 10^6$ | $8.67 \times 10^6 \pm 2.73 \times 10^6$ | <10 |
| Nano-filtration membrane | CFU (cells/mL) | *E. coli* | $1.18 \times 10^8 \pm 2.31 \times 10^7$ | $1.05 \times 10^8 \pm 3.39 \times 10^7$ | $6.67 \times 10^7 \pm 1.51 \times 10^7$ |
| | | *B. subtilis* | $1.08 \times 10^7 \pm 1.72 \times 10^6$ | $8.67 \times 10^6 \pm 2.42 \times 10^6$ | $1.10 \times 10^6 \pm 6.63 \times 10^5$ |

Figures 8A, 8B, 8C, 8D, 8E:
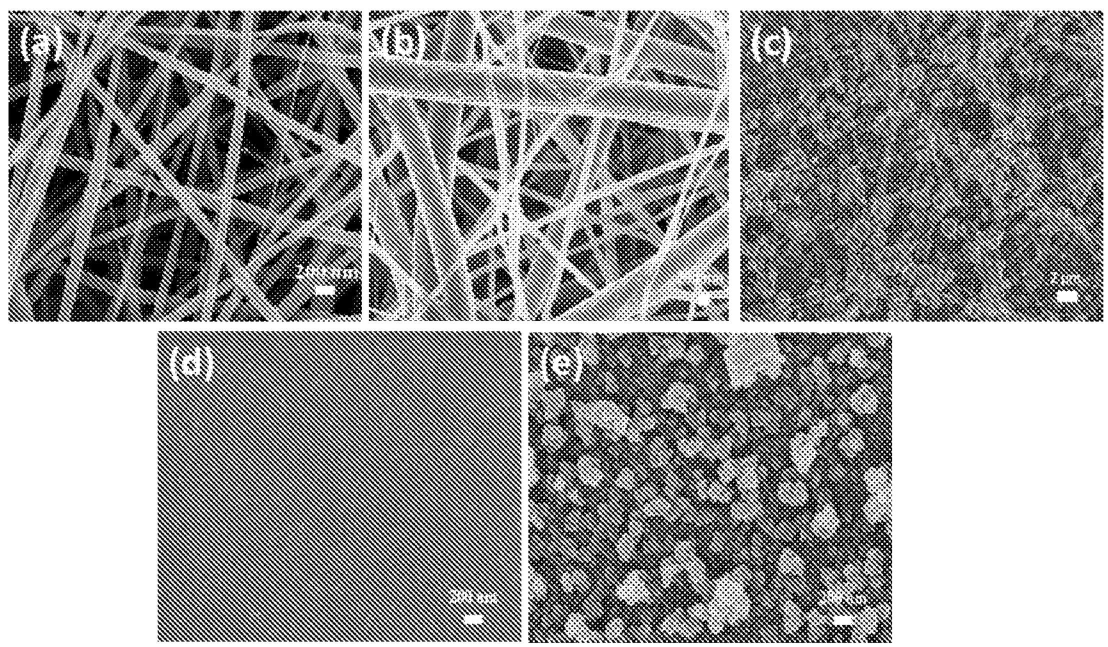

FIGS. 8*a*-8*e* show SEM images of nano-fibrous membrane, ultrafiltration (UF) and nanofiltration membrane (NF). In particular, FIG. 8*a* shows a homogenous structure of the type shown schematically in FIGS. 3*a*, 4*a* and 5*a*. FIG. 8*b* shows a composite structure with large diameter nanofibers and small diameter nanofibers of the type shown schematically in FIGS. 3*b* and 4*b*. FIG. 8*c* shows a composite structure composed of nanofibers with nanobeads or microspheres. In FIG. 8*d* there is shown a surface morphology of ultrafiltration membrane. Finally, FIG. 8*e* shows a nanofiltration membrane prepared through interfacial polymerization.

The water filter of the present invention can remove unwanted particles (e.g. suspended inorganic particles and organic particles), biological entities (e.g. pathogen and bacteria), and heavy metal ions (e.g. $Pb^{2+}$, $Cd^{2+}$, $Ni^{2+}$ and $Cr^{6+}$). With good permeability, the nanofibrous membrane in this invention can be used as a water filtration system. In addition, with silver loading of silver nanoparticles in-situ on the surface of the membrane the filter is provided with water disinfection properties.

The advantages of the present water filter invention are a) light-weight, b) high water throughput (orders of magnitude higher than the commercial MF and UF membranes), c) driven by gravity directly or by mechanical assist, so no electricity is needed, d) high disinfection power and e) antifouling and anti-bacterial effects. In addition, the water filter product of the present invention enjoys several advantages compared to the existing commercial products as follows: f) can be used as a portable water purification device, g) is disposable and different types are available for different treatment applications, h) low cost, i) water permeability can be further improved through a mechanical-assist system and j) operation is very simple, no need for complex instructions.

While the present invention has been particularly shown and described with reference to preferred embodiments thereof, it will be understood by those skilled in the art that various changes in form and details may be made therein without departing from the spirit and scope of the invention.

We claim:

1. A composite membrane, comprising:

polymeric nanofibers, and a polydopamine layer that is a surface coating of polydopamine compounds, wherein the composite membrane has a composite structure including a first plurality of nanofibers having first diameters and a second plurality of nanofibers having second diameters that are different from the first diameters, the first plurality of nanofibers having a chemical composition different from that of the second plurality of nanofibers, the first plurality and second plurality of nanofibers together having an average diameter in a range of 100-1000 nm, and the polymeric nanofiber membrane having a porosity in a range of 75-95% and a mean pore size in a range of 10-1000 nm.

2. The composite membrane according to claim 1, wherein the composite membrane has a thickness of 50-500 μm.

3. The composite membrane according to claim 1, wherein the first plurality of nanofibers has diameters in a range of greater than 500 nm and smaller than 1000 nm and the second plurality of nanofibers has diameters in a range of 100-500 nm.

4. The composite membrane according to claim 1, wherein the polymeric nanofibers comprise hydrophobic polymeric nanofibers or hydrophilic polymeric nanofibers.

5. The composite membrane according to claim 1, wherein polymers forming the polymeric nanofibers are selected from a group consisting of poly(acrylonitrile) (PAN), poly(vinyl alcohol) (PVA), poly(vinyl fluoride) (PVDF), chitosan, polysulfone (PSf), polyethersulfone (PES), poly(methyl methacrylate) (PMMA) and poly(vinyl butyral) (PVB).

6. The composite membrane according to claim 1, further comprising nano-beads or microspheres disposed on surfaces of the composite structure.

7. The composite membrane according to claim 6, wherein the nano-beads or microspheres have an average diameter of 20-2000 nm.

8. The composite membrane according to claim 1, further comprising in-situ surface loaded silver nanoparticles disposed on surfaces of the composite membrane.

9. The composite membrane according to claim 8, wherein the in-situ surface loaded silver nanoparticles are reduced by the polydopamine layer.

10. The composite membrane according to claim 8, wherein the in-situ surface loaded silver nanoparticles have a loading amount greater than zero and smaller than 5.0 wt. %.

11. The composite membrane according to claim 8, wherein the in-situ surface loaded silver nanoparticles have an average diameter greater than zero and smaller than 100 nm.

12. A gravity-driven nano-fibrous membrane filter comprising:

a support structure forming an open top volume; and a composite membrane according to claim 1 on at least a bottom of the support structure, the composite membrane having a folded configuration, the filter accepting feed water at the open top volume and allowing cleaned water to exit below the composite membrane at the bottom.

13. The gravity-driven nano-fibrous membrane filter according to claim 12, further comprising a mechanically assisted vacuum system for drawing the feed water entered at top of the filter through the membrane.

14. The gravity-driven nano-fibrous membrane filter according to claim 13, wherein the mechanically assisted vacuum system comprises a piston located below the filter and a handle connected to the piston that allows the piston to be pulled down creating a vacuum on an opposite side of the membrane from the feed water.

15. The gravity-driven nano-fibrous membrane filter according to claim 12, wherein silver is loaded onto the composite membrane to provide water purification.

16. The composite membrane of claim 1, wherein the first plurality of nanofibers and the second plurality of nanofibers are interwoven into a single fiber layer.

* * * * *